United States Patent
Kamata et al.

(10) Patent No.: US 7,123,456 B2
(45) Date of Patent: Oct. 17, 2006

(54) METHOD OF MAKING MAGNETORESISTIVE HEAD ELEMENT

(75) Inventors: Chikayoshi Kamata, Kawasaki (JP); Hitoshi Kishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 998 days.

(21) Appl. No.: 09/785,112

(22) Filed: Feb. 16, 2001

(65) Prior Publication Data

US 2002/0030951 A1 Mar. 14, 2002

(30) Foreign Application Priority Data

Sep. 12, 2000 (JP) ........................ 2000-277060

(51) Int. Cl.
*G11B 5/39* (2006.01)

(52) U.S. Cl. .............. 360/327.3; 29/603.01; 29/603.15; 29/603.16

(58) Field of Classification Search .......... 216/22; 29/603.1, 630.01; 360/327.3, 327.31, 327.32, 360/324.12, 324.11
See application file for complete search history.

(56) References Cited

U.S. PATENT DOCUMENTS

| | | | | |
|---|---|---|---|---|
| 5,314,596 A | * | 5/1994 | Shukovsky et al. | 204/192.2 |
| 5,566,075 A | * | 10/1996 | Syouji et al. | 29/603.12 |
| 5,946,168 A | * | 8/1999 | Hashimoto et al. | 360/327.3 |
| 5,961,848 A | * | 10/1999 | Jacquet et al. | 29/603.01 |
| 6,181,532 B1 | * | 1/2001 | Dovek et al. | 360/327.3 |
| 6,266,218 B1 | * | 7/2001 | Carey et al. | 360/324.12 |
| 6,729,015 B1 | * | 5/2004 | Matono et al. | 29/603.01 |

FOREIGN PATENT DOCUMENTS

JP 11-339228 12/1999

OTHER PUBLICATIONS

English Translation of JP 11-339228 (JP Patent No. 2933916), Yoshida et al., Dec. 10, 1999.*

* cited by examiner

*Primary Examiner*—George J. Letscher
*Assistant Examiner*—Christopher R. Magee
(74) *Attorney, Agent, or Firm*—Greer, Burns & Crain, Ltd.

(57) ABSTRACT

A combined stripe of a magnetoresistive (MR) film and domain control stripe layers can be formed below a photoresist film on the surface of a substratum. An insulating base layer is then formed to extend over the surface of the substratum. The insulating base layer is allowed to cover over the photoresist film, the magnetoresistive film and the domain control stripe layers on the substratum. When the photoresist film is removed, the insulating base layer remains on the substratum. The insulating base layer keeps contacting the side surface of the magnetoresistive film. The magnetoresistive film can be kept covered with the insulating base layer at the side surface during a subsequent etching process. Any chemical reaction can be avoided between the magnetoresistive film and the etching gas employed in the etching process. The resulting magnetoresistive head element is allowed to exhibit an ideal characteristic in the magnetoresistive effect.

7 Claims, 14 Drawing Sheets

METHOD OF MAKING MAGNETORESISTIVE HEAD ELEMENT

BACKGROUND OF THE INVENTION

1. Field of the Invention

The present invention relates to a magnetoresistive (MR) head element utilized to read magnetic information data out of a magnetic recording medium such as a magnetic disk, a magnetic tape, and the like. The invention also relates to a method of making the same magnetoresistive head element.

2. Description of the Prior Art

As disclosed in Japanese Patent Registration No. 2933916, for example, a conventional giant magnetoresistive (GMR) head element is proposed to include a pair of conductive lead layers covering over a magnetoresistive film, such as a spin valve film, at the tip ends, respectively. The method of making the conventional GMR head element is in general designed to include a step of forming the spin valve film and hard or soft magnetic stripe layers, corresponding to domain control stripe layers, on a substrate such as a wafer. A conductive material layer is then formed to uniformly spread over the spin valve film and the magnetic stripe layers. The conductive lead layers are shaped out of the thus formed conductive material layer. A reactive ion etching (RIE) process or the like is in general employed to form the conductive lead layers in this manner.

The present inventors have revealed that the GMR head element, thus formed with the RIE process, cannot accurately read magnetic information data out of a magnetic recording medium. In other words, the GMR head element tends to fail in discriminating magnetic binary data at a higher accuracy.

SUMMARY OF THE INVENTION

It is accordingly an object of the present invention to provide a magnetoresistive head element capable of discriminating magnetic binary data at a higher accuracy in response to a magnetic field acting from a magnetic recording medium. It is also an object of the present invention to provide a method of making such a magnetoresistive head element.

According to a first aspect of the present invention, there is provided a method of making a magnetoresistive head element, comprising: forming a magnetoresistive film extending over a surface of a substratum, said magnetoresistive film having a side surface standing on the surface of the substratum; forming an insulating base layer over the surface of the substratum, said insulating base layer contacting at least partly the side surface of the magnetoresistive film; and effecting an etching process while keeping the insulating base layer contacting the side surface of the magnetoresistive film.

The insulating base layer serves to cover over the side surface of the magnetoresistive film standing on the surface of the substratum in the aforementioned method. The exposure of the side surface of the magnetoresistive film can be prevented on the surface of the substratum. When the etching process is effected on the substratum in this condition, any chemical reaction can reliably be avoided between the magnetoresistive film and the etching gas employed in the etching process. It is thus possible to reliably prevent any adhesion or deposition of a metallic compound resulting from oxidation of atoms included in the magnetoresistive film, a metallic compound resulting from a chemical reaction of atoms in the magnetoresistive film attacked by the etching gas, and the like. It has been proved that such avoidance of generation of an impurity or unexpected substance on the magnetoresistive film leads to establishment of an ideal characteristic in the magnetoresistive effect of the magnetoresistive head element.

Prior to formation of the insulating base layer, a domain control stripe layer may be formed over the surface of the substratum in the method so as to contact the magnetoresistive film at its tip end. In this case, the insulating base layer is also allowed to contact a side surface of the domain control stripe layer adjacent the side surface of the magnetoresistive film. The magnetoresistive film can be interposed between a pair of the domain control stripe layers in the magnetoresistive head element. The domain control stripe layers are supposed to reliably promote establishment of a single magnetic domain in a magnetic or free layer in the magnetoresistive film. The magnetoresistive head element is thus allowed to still reliably contribute to discrimination of magnetic binary data in response to change in the polarity of a magnetic field applied to the magnetoresistive film.

According to a second aspect of the present invention, there is provided a method of making a magnetoresistive head element, comprising: forming a layered composite, corresponding to a layered structure of a magnetoresistive film, over a surface of a substratum; forming a pair of material layers, corresponding to materials of domain control stripe layers, over the surface of the substratum, said material layers interposing the layered composite therebetween along the surface of the substratum; forming a resist film on the layered composite and the material layers so as to pattern a shape of the magnetoresistive film and the domain control stripe layers continuous one another; removing the layered composite and the material layers in a region adjacent the resist film so as to shape the magnetoresistive film and the domain control stripe layers out of the layered composite and the material layers below the resist film; forming an insulating base layer over the resist film and the surface of the substratum; and removing the resist film so as to expose the magnetoresistive film and the domain control stripe layers at a gap defined in the insulating base layer.

A combined stripe of the magnetoresistive film and the domain control stripe layers below the resist film can be embedded at the gap defined in the insulating base layer in a facilitated manner. The combined stripe can reliably be covered with the insulating base layer at a side surface standing on the surface of the substratum. The exposure of the side surface of the magnetoresistive film can be prevented on the surface of the substratum.

An etching process may be effected in the aforementioned method of making while keeping the insulating base layer in a region adjacent the magnetoresistive film over the surface of the substratum. If the magnetoresistive film is kept covered with the insulating base layer at the side surface in the aforementioned manner, any chemical reaction can reliably be prevented between the magnetoresistive film and the etching gas employed in the etching process. It is thus possible to reliably prevent any adhesion or deposition of a metallic compound resulting from oxidation of atoms included in the magnetoresistive film, a metallic compound resulting from a chemical reaction of atoms in the magnetoresistive film attacked by the etching gas, and the like.

The method of making may further comprise: forming a conductive layer covering over at least the magnetoresistive film and the insulating base layer, prior to the etching process; and exposing the conductive layer to an etching gas with the side surface of the magnetoresistive film kept covered.

A conductive terminal or lead layer can be shaped out of the conductive layer. In general, a sensing current is supplied to the magnetoresistive film through the conductive terminal or lead layer in the magnetoresistive head element. If the magnetoresistive film kept covered with the insulating base layer at the side surface, it is likewise possible to reliably prevent any adhesion or deposition of a metallic compound resulting from oxidation of atoms included in the magnetoresistive film, a metallic compound resulting from a chemical reaction of atoms in the magnetoresistive film attacked by the etching gas, and the like.

The method of making can be utilized to provide a magnetoresistive head element comprising: a magnetoresistive film extending over a surface of a substratum so as to define a side surface standing on the surface of the substratum; a domain control stripe layer connected to the magnetoresistive film at its tip end so as to define a side surface standing adjacent the side surface of the magnetoresistive film on the substratum; an insulating base layer extending over the surface of the substratum so as to contact the side surface of the magnetoresistive film and the side surface of the domain control stripe layer; and a conductive lead layer covering over the domain control stripe layer and the insulating base layer.

Here, the insulating base layer may be made from an insulating material such as $Al_2O_3$, $SiO_2$, and the like. The insulating base layer may be continuous to continuous to a primary insulating layer covering over the magnetoresistive film. Integration of the insulating base layer and the primary insulating layer may lead to vanishment of an interface or boundary between the insulating base layer and the primary insulating layer.

The thus magnetoresistive head element can be employed in a magnetic recording medium drive or storage device such as a magnetic disk drive and a magnetic tape drive. The magnetic disk drive may include a hard disk drive (HDD), for example.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
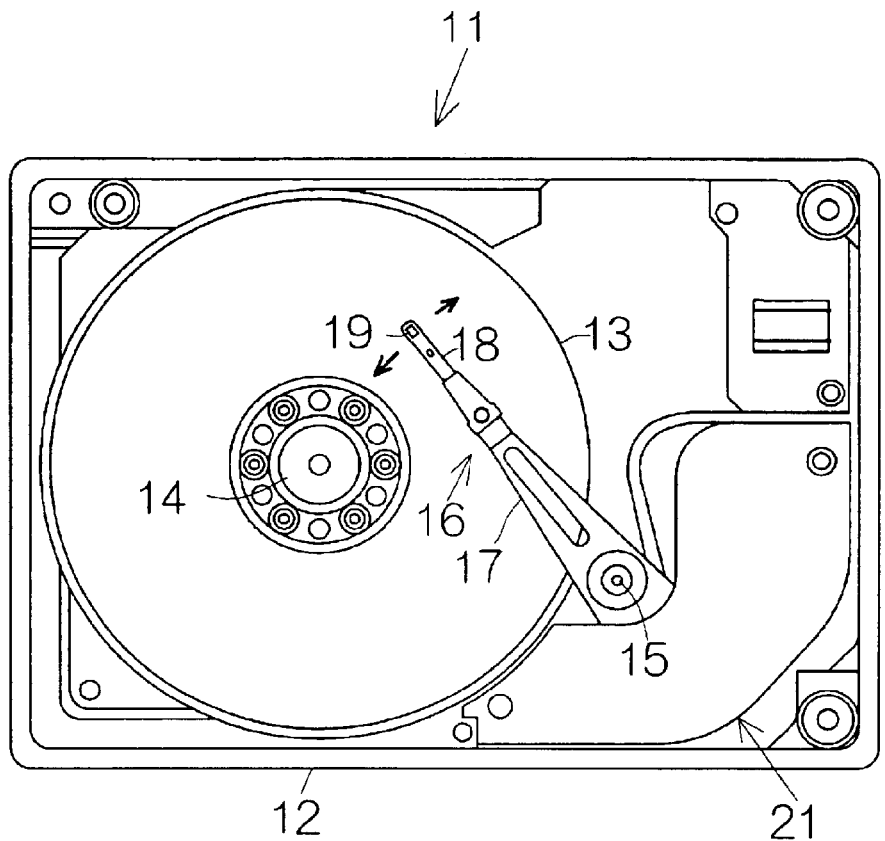
FIG. 1 is a plan view schematically illustrating the structure of a hard disk drive (HDD)

FIG. 1 schematically illustrates the interior structure of a hard disk drive (HDD) 11 as an example of a magnetic recording medium drive or storage device. The HDD 11 includes a box-shaped primary enclosure 12 defining an inner space of a flat parallelepiped, for example. At least one magnetic recording disk 13 is accommodated in the inner space within the primary enclosure 12. The magnetic recording disk 13 is mounted on a driving shaft of a spindle motor 14. The spindle motor 14 is allowed to drive the magnetic recording disk 13 for rotation at a higher revolution speed such as 7,200 rpm or 10,000 rpm, for example. A cover, not shown, is coupled to the primary enclosure 12 so as to define the closed inner space between the primary enclosure 12 and itself.

A carriage 16 is also accommodated in the inner space of the primary enclosure 12 for swinging movement about a vertical support shaft 15. The carriage 16 includes a rigid swinging arm 17 extending in the horizontal direction from the vertical support shaft 15, and an elastic head suspension 18 fixed to the tip end of the swinging arm 17 so as to extend forward from the swinging arm 17. As conventionally known, a flying head slider 19 is cantilevered at the head suspension 18 through a gimbal spring, not shown. The head suspension 18 serves to urge the flying head slider 19 toward the surface of the magnetic recording disk 13. When the magnetic recording disk 13 rotates, the flying head slider 19 is allowed to receive airflow generated along the rotating magnetic recording disk 13. The airflow serves to generate a lift on the flying head slider 19. The flying head slider 19 is thus allowed to keep flying above the surface of the magnetic recording disk 13 during rotation of the magnetic recording disk 13 at a higher stability established by the balance between the lift and the urging force of the head suspension 18.

When the carriage 16 is driven to swing about the support shaft 15 during flight of the flying head slider 19, the flying head slider 19 is allowed to cross the recording tracks defined on the magnetic recording disk 13 in the radial direction of the magnetic recording disk 13. This radial movement serves to position the flying head slider 19 right above a target recording track on the magnetic recording disk 13. In this case, an electromagnetic actuator 21 such as a voice coil motor (VCM) can be employed to realize the swinging movement of the carriage 16, for example. As conventionally known, in the case where two or more magnetic recording disks 13 are incorporated within the inner space of the primary enclosure 12, a pair of the elastic head suspensions 18 are mounted on a single common swinging arm 17 between the adjacent magnetic recording disks 13.

Figure 2:
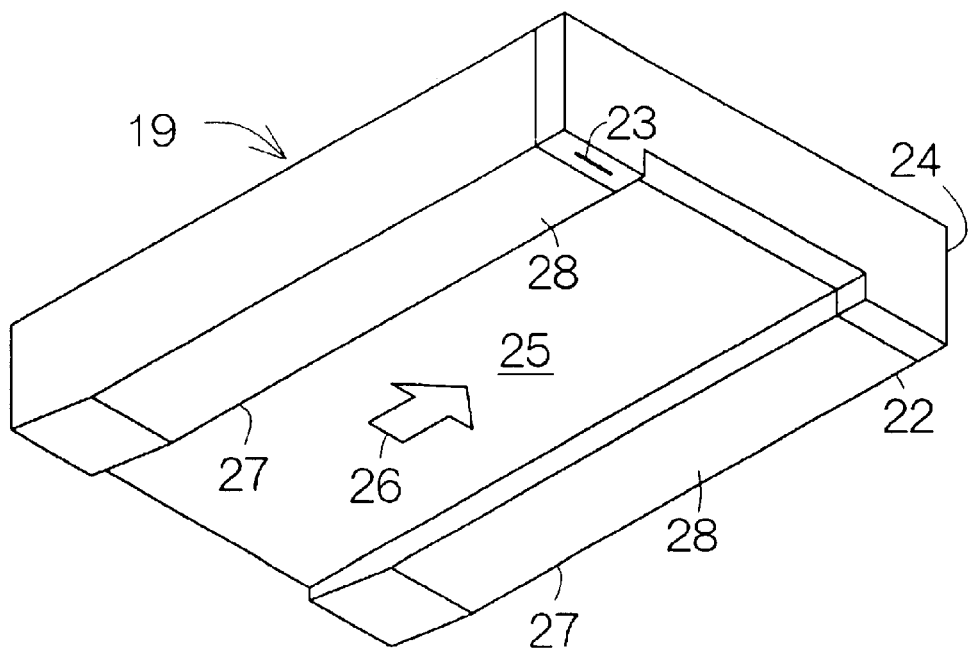
FIG. 2 is an enlarged perspective view of a flying head slider according to a specific example.

FIG. 2 illustrates a specific example of the flying head slider 19. The flying head slider 19 of this type includes a slider body 22 made from $Al_2O_3$—TiC in the form of a flat parallelepiped, and a head containing layer 24 coupled to the trailing or downstream end of the slider body 22. The head containing layer 24 may be made of $Al_2O_3$. A read/write electromagnetic transducer 23 is embedded in the head containing layer 24. A medium-opposed surface or bottom surface 25 is defined continuously over the slider body 22 and the head containing layer 24 so as to face the surface of the magnetic recording disk 13 at a distance. The bottom surface 25 is designed to receive airflow 26 generated along the surface of the rotating magnetic recording disk 13.

A pair of rails 27 are formed to extend over the bottom surface 25 from the leading or upstream end toward the trailing or downstream end. The individual rail 27 is designed to define an air bearing surface (ABS) 28 at its top surface. In particular, the airflow 26 generates the aforementioned lift at the respective air bearing surfaces 28. The read/write electromagnetic transducer 23 embedded in the head containing layer 24 is exposed at the air bearing surface 28 as described later in detail. The flying head slider 19 may take any shape or form other than the above-described one.

Figure 3:
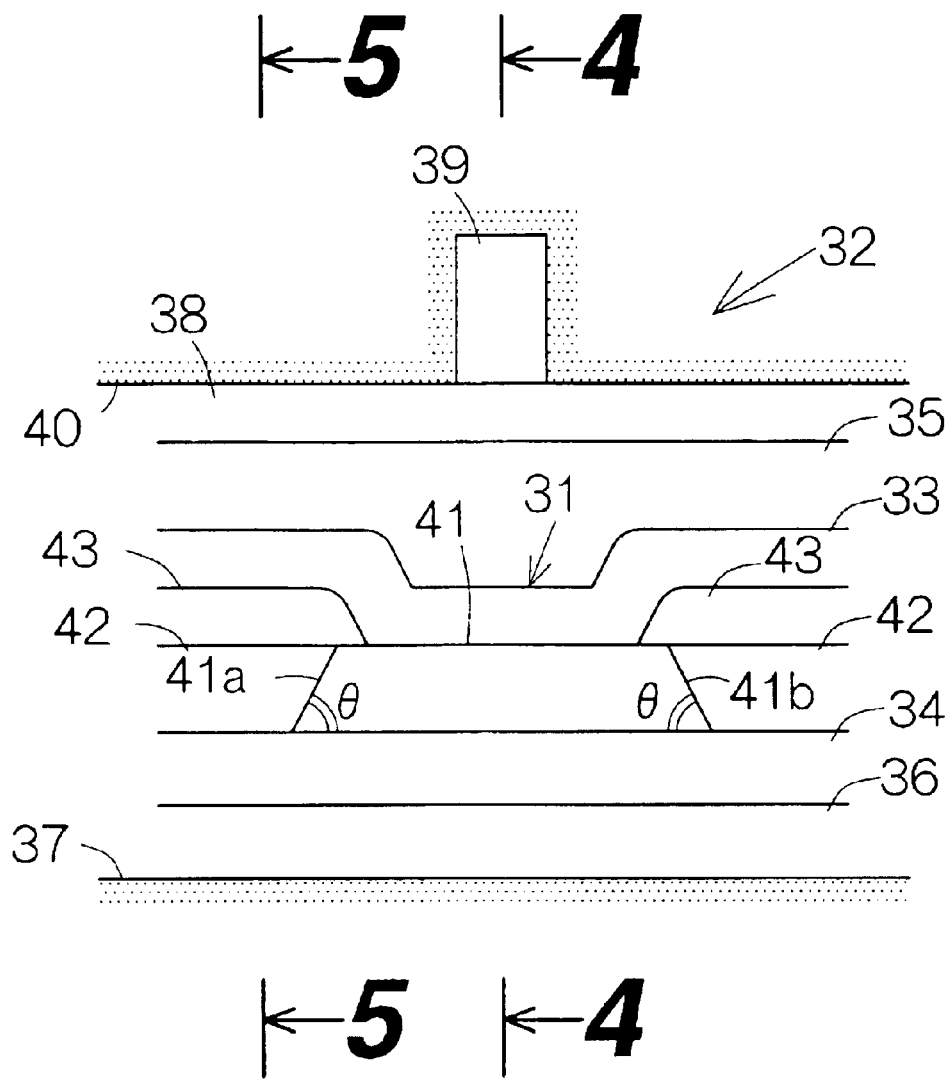
FIG. 3 is an enlarged front view of a read/write electromagnetic transducer observed at a bottom surface of the flying head slider.

FIG. 3 illustrates an enlarged detailed view of the read/write electromagnetic transducer 23 exposed at the bottom surface 25. The read/write electromagnetic transducer 23 includes a magnetoresistive (MR) head element 31 for reading magnetic binary data out of the magnetic recording disk 13, and an inductive write element or a thin film magnetic head element 32 for recording magnetic binary data into the magnetic recording disk 13. The magnetoresistive head element 31 is designed to utilize the variation in the electric resistance induced in response to a magnetic field acting from the magnetic recording disk 13. The thin film magnetic head element 32 is designed to utilize a magnetic field induced based on a conductive swirly coil pattern, not shown. The magnetoresistive head element 31 is interposed between upper and lower non-magnetic gap layers 33, 34 which are in turn interposed between upper and lower shield layers 35, 36. The upper and lower shield layers 35, 36 may be made from magnetic material such as FeN and NiFe, for example. The lower shield layer 36 is allowed to spread over the surface of an alumina ($Al_2O_3$) layer 37.

The thin film magnetic head element 32 includes a non-magnetic gap layer 38 spreading over the surface of the upper shield layer 35. The non-magnetic gap layer 38 may be made from alumina ($Al_2O_3$), for example. The non-magnetic gap layer 38 serves to space an upper magnetic pole layer 39 from the upper shield layer 35. The upper magnetic pole layer 39 may be made from NiFe, for example. The upper magnetic pole layer 39 is covered with an alumina ($Al_2O_3$) layer 40 spreading over the surface of the non-magnetic gap layer 38. The alumina layer 40 serves to form the aforementioned head containing layer 24 in combination with the alumina layer 37.

A combination of the upper magnetic pole layer 39 and the upper shield layer 35 establishes a magnetic core of the thin film magnetic head element 32. Namely, the upper shield layer 35 of the magnetoresistive head element 31 functions as a lower magnetic pole layer of the thin film magnetic head element 32. When a magnetic field is induced at the conductive swirly coil pattern, a magnetic flux is exchanged between the upper magnetic pole layer 39 and the upper shield layer 35. The non-magnetic gap layer 38 allows the exchanged magnetic flux to leak out of the bottom surface 25. The thus leaked magnetic flux forms a magnetic field for recordation, namely, a write gap magnetic field.

The magnetoresistive head element 31 includes a magnetoresistive or spin valve film 41 extending over the non-magnetic gap layer 34 serving as a substratum. A pair of end surfaces 41a, 41b are defined on the spin valve film 41 along planes intersecting the surface of the non-magnetic layer 34. The end surfaces 41a, 41b or planes are designed to intersect the surface of the non-magnetic layer 34 by an inclined angle θ, respectively.

Likewise, a pair of magnetic stripe layers, namely, domain control stripe layers 42, are formed on the surface of the non-magnetic gap layer 34 or the substratum so as to interpose the spin valve film 41 therebetween along the bottom surface 25. The domain control stripe layers 42 are designed to extend on the surface of the non-magnetic gap layer 34 along the bottom surface 25. The tip ends of the respective domain control stripe layers 42 are connected to the end surfaces 41a, 41b of the spin valve film 41. A pair of conductive terminal or lead layers 43 are allowed to spread over the surface of the domain control stripe layers 42. A sensing current can be supplied to the spin valve film 41 through the conductive lead layers 43.

Figure 4:
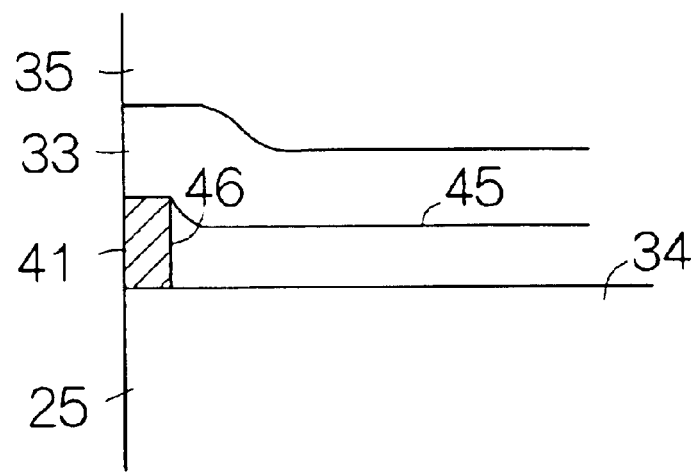
FIG. 4 is a partial sectional view taken along the line 4—4 in FIG. 3.

As shown in FIG. 4, an insulating base layer 45 is allowed to spread over the surface of the non-magnetic gap layer 34. An front end of the insulating base layer 45 is designed to contact the spin valve film 41. The spin valve film 41 receives the insulating base layer 45 at a side surface 46 standing from the surface of the non-magnetic gap layer 34. The insulating base layer 45 may be made from an insulating material such as alumina ($Al_2O_3$), $SiO_2$, and the like. In the case where the insulating base layer 45 is made from alumina, an interface or boundary may not be observed between the insulating base layer 45 and the non-magnetic gap layer 33. In this case, the insulating base layer 45 may smoothly be continuous to the non-magnetic gap layer 33, namely, an primary insulating layer covering over the spin valve film 41.

Figure 5:
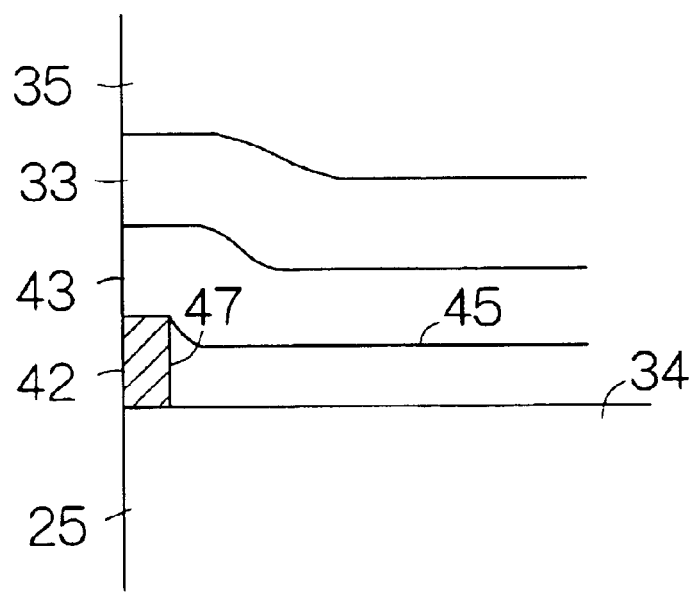
FIG. 5 is a partial sectional view taken along the line 5—5 in FIG. 3.

As shown in FIG. 5, side surfaces 47 are defined on the domain control stripe layers 42 so as to stand, adjacent the side surface 46 of the spin valve 41, on the surface of the non-magnetic gap layer 34. The side surfaces 46, 47 are allowed to extend over an identical plane. The insulating base layer 45 spreading over the surface of the non-magnetic gap layer 34 in the aforementioned manner contacts the side surfaces 46 of the domain control stripe layers 42 at the tip end. The conductive lead layers 43 is allowed to cover over the domain control stripe layers 42 and the insulating base layer 45.

Figure 6:
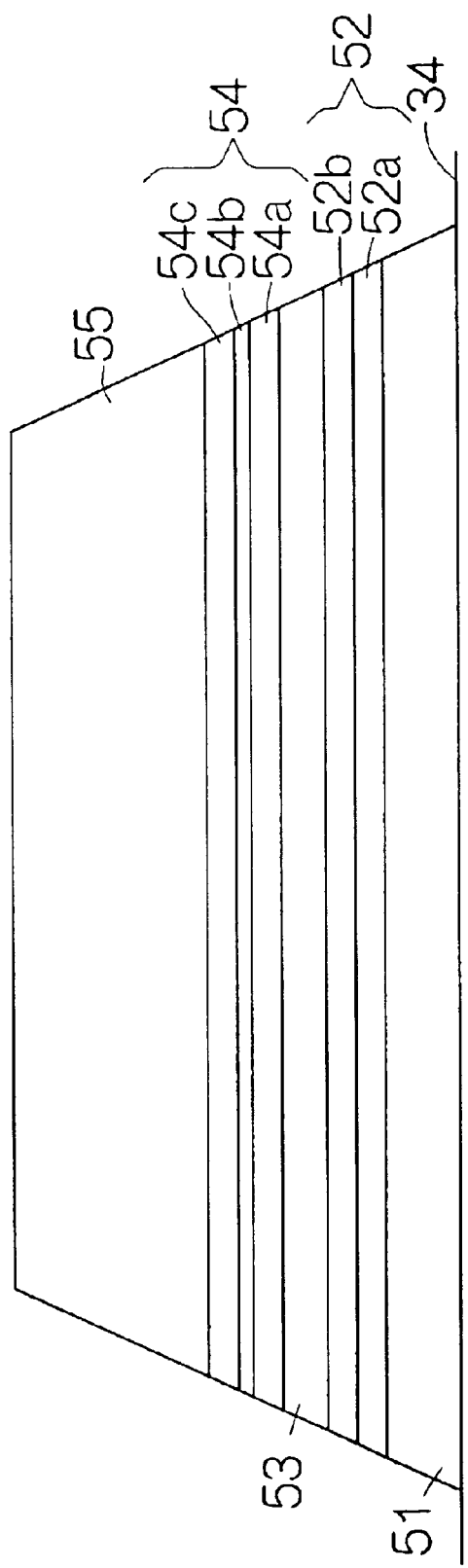
FIG. 6 is an enlarged front view schematically illustrating the structure of a spin valve film.

As shown in FIG. 6, the spin valve film 41 includes a basement layer 51 extending over the surface of the non-magnetic gap layer 34. The basement layer 51 may be made of a Ta layer having the thickness of approximately 5.0 nm, for example. A magnetic layer, namely, a so-called free layer 52 extends over the basement layer 51. The free layer 52 may comprise an NiFe layer 52a of approximately 2.0 nm thickness extending over the surface of the basement layer 51, and a CoFeB layer 52b of approximately 1.5 nm thickness extending over the NiFe layer 52a, for example.

A non-magnetic spacer layer 53 is formed to extend over the free layer 52. The non-magnetic spacer layer 53 may be made of a Cu layer having the thickness of approximately 2.8 nm, for example. A magnetic layer of a layered structure, namely, a so-called pinned layer 54 is superposed over the non-magnetic spacer layer 53. The pinned layer 54 may comprise a first CoFeB layer 54a of approximately 2.0 nm thickness extending over the surface of the non-magnetic spacer layer 53, a coupling or Ru layer 54b of approximately 0.8 nm thickness superposed on the first CoFeB layer 54a, and a second CoFeB layer 54c of approximately 1.5 nm thickness extending over the Ru layer 54b, for example.

An antiferromagnetic layer 55 as a pinning layer is superposed on the surface of the pinned layer 54. The antiferromagnetic layer 55 may be made of a PdPtMn layer of approximately 13.0 nm thickness, for example. A strong exchange coupling can thus be established between the antiferromagnetic layer 55 and the pinned layer 54. Specifically, the antiferromagnetic layer 55 serves to pin or fix the magnetic orientation of the pinned layer 54.

When the magnetoresistive head element 31 is opposed to the surface of the magnetic recording disk 13 for reading magnetic information data, the magnetic orientation of the free layer 52 can be rotated in the spin valve film 41 in response to change in the polarity of a magnetic field applied from the magnetic recording disk 13, as conventionally known. The rotation of the magnetic orientation in the free layer 52 induces variation in the electric resistance of the spin valve film 41. When a sensing current is supplied to the spin valve film 41 through the conductive lead layers 43, a variation in voltage appears in the sensing current, for example. The variation in voltage can be utilized to detect magnetic binary data recorded on the magnetic recording disk 13.

Figure 7:
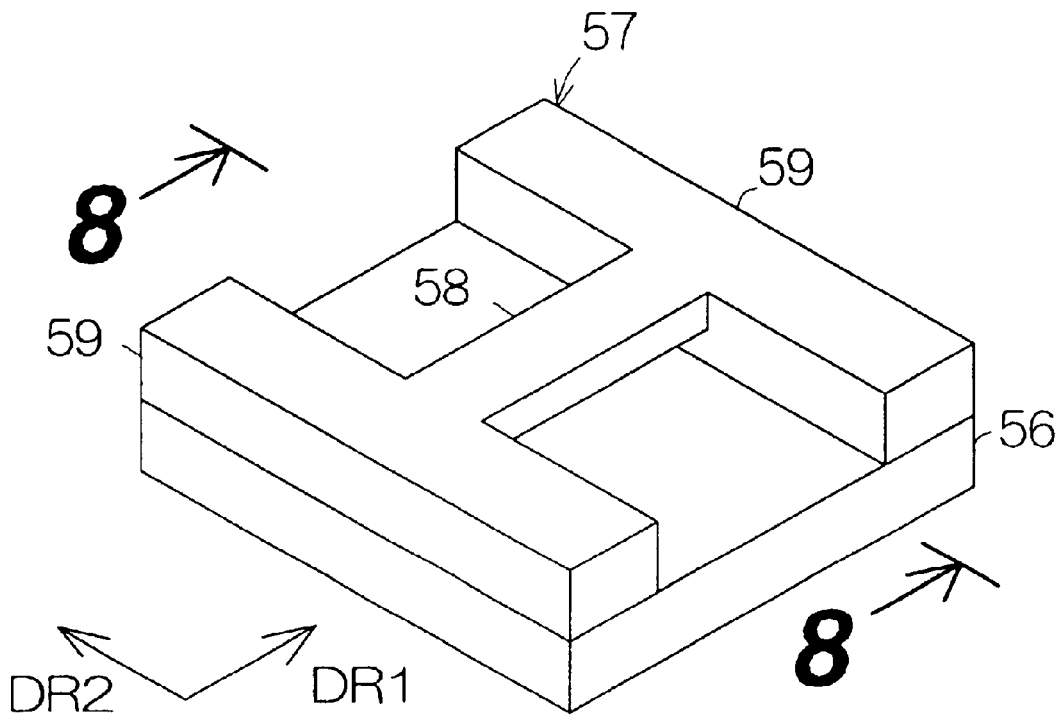
FIG. 7 is a perspective view illustrating a layered composite and a photoresist film sequentially laminated on the surface of a non-magnetic gap layer.

Next, a detailed description will be made on a method of making the magnetoresistive head element 31. As conventionally known, an $Al_2O_3$—TiC wafer, not shown, with a lamination of the alumina layer 37 over the upper surface is first prepared. The lower shield layer 36 and the non-magnetic gap layer 34 are sequentially laminated over the alumina layer 37. Subsequently, a layered composite 56 is formed on the surface of the non-magnetic gap layer 34, namely, the substratum, as shown in FIG. 7. The layered composite 56 has the layered structure identical to that of the spin valve film 41. Specifically, a Ta layer, an NiFe layer, a CoFeB layer, a Cu layer, a CoFeB layer, an Ru layer, a CoFeB layer and a PdPtMn layer are sequentially laminated on the surface of the non-magnetic gap layer 34 so as to provide the layered composite 56. In this case, a cap layer is also laminated over the surface of the PdPtMn layer in the layered composite 56. The cap layer may include a Ta layer of approximately 6.0 nm thickness laminated over the surface of the PdPtMn layer, and an Au layer of approximately 5.0 nm thickness laminated over the Ta layer. A sputtering process can be employed to form the layered composite 56.

Figure 8:
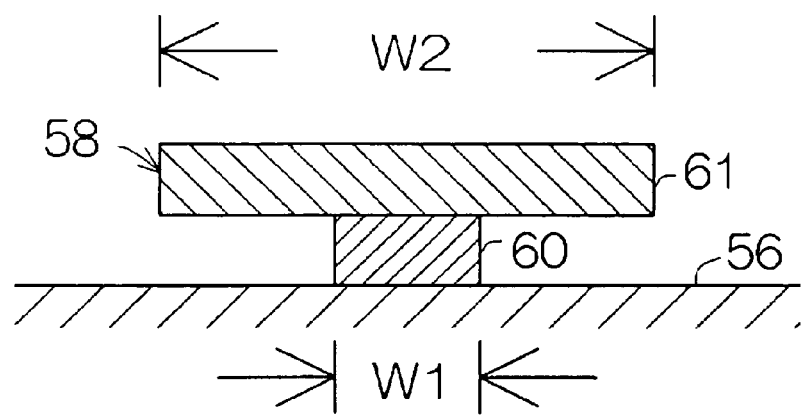
FIG. 8 is a sectional view taken along the line 8—8 in FIG. 7.

As shown in FIG. 7, a photoresist film 57 is formed to extend over the surface of the layered composite 56. The photoresist film 57 includes an eaves stripe film 58 extending in a first direction DR1, and a pair of support stripe films 59 connected to the opposite ends of the eaves stripe film 58 so as to extend in a second direction DR2 perpendicular to the first direction DR1. The eaves stripe film 58 includes a lower basement stripe layer 60 designed to extend over the surface of the layered composite 56 in the first direction DR1 by a first width W1, of approximately 0.15 μm, and an upper roof layer 61 designed to extend over the surface of the lower basement layer 60 in the first direction DR1 by a second width W2, of approximately 0.5 μm, larger than the first width W1, as is apparent from FIG. 8. The support stripe films 59 are utilized to prevent the eaves stripe film 58 from falling down. An I-line stepper may be employed to form the photoresist film 57, for example.

Figure 9:
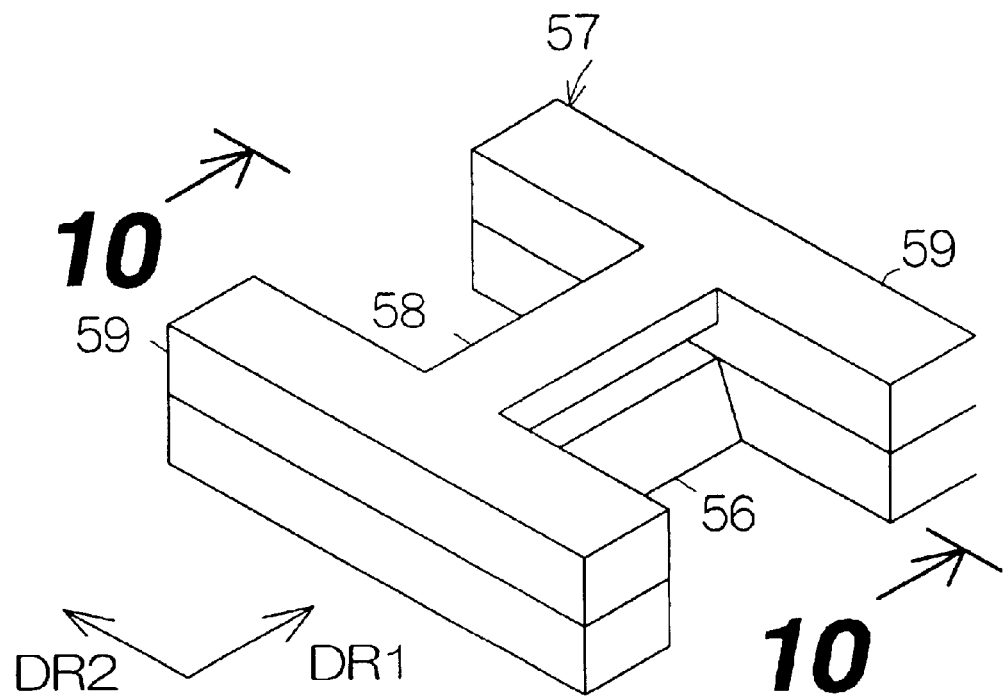
FIG. 9 is a perspective view of the layered composite and the photoresist film for illustrating the process of shaping the layered composite under the mask of the photoresist film.
Figure 10:
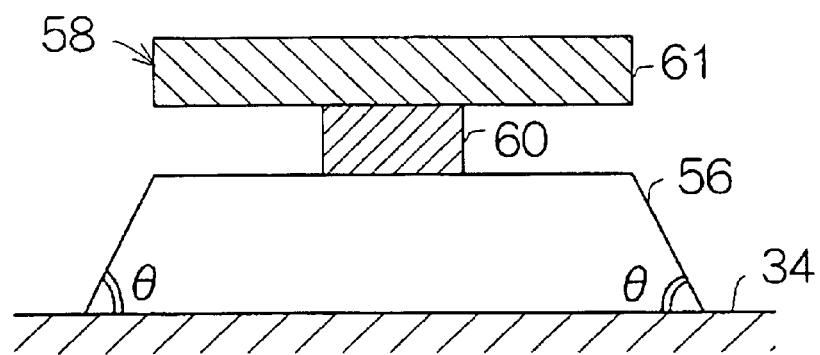
FIG. 10 is a sectional view taken along the line 10—10 in FIG. 9.

The layered composite 56 is then subjected to an ion milling process. The incident angle of an argon ion beam is set in the direction normal to the surface of the non-magnetic gap layer 34, namely, the substratum, in this ion milling process. If the ion milling process is effected in this condition, the layered composite 56 is removed in a region adjacent the photoresist film 57. A stripe of the layered composite 56 remains right below the eaves stripe film 58, as shown in FIG. 9, so as to extend in the first direction DR1. Side surfaces are thus defined on the remaining stripe of layered composite 56, as is apparent from FIG. 10, so as to extend along planes intersecting the surface of the non-magnetic gap layer 34 by the inclined angle θ.

Figure 11:
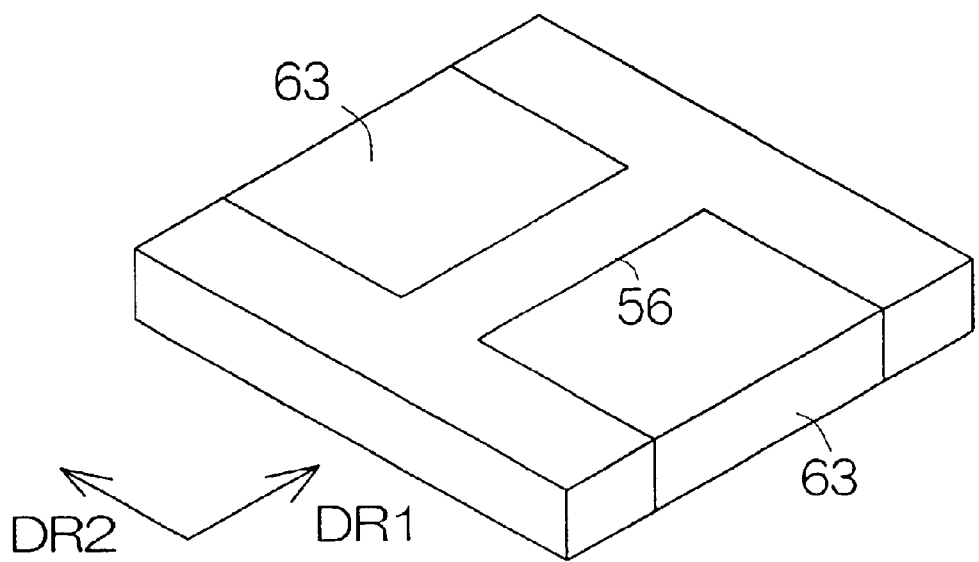
FIG. 11 is a schematic perspective view of the layered composite interposed between material layers.

Thereafter, a material layer corresponding to the material, such as CoCrPt, of the domain control stripe layers 42 is formed to extend over the surface of the non-magnetic gap layer 34. The photoresist film 57 is maintained during formation of the material layer. When the photoresist film 57 is removed after the formation of the material layer, a pair of material layers 63 are obtained to interpose the stripe of the layered composite material 56 along the surface of the non-magnetic gap layer 34, as shown in FIG. 11. A sputtering process may be employed to form the material layer, for example. An $O_2$ plasma, a suitable photoresist stripper or stripping solution, and the like, may be employed to remove the photoresist film 57, for example.

Figure 12:
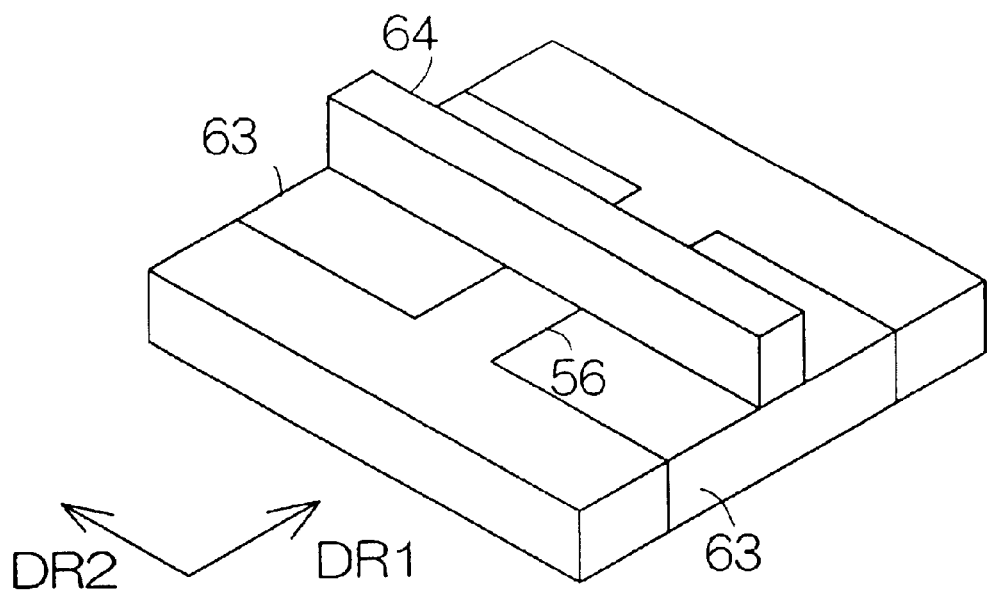
FIG. 12 is a perspective view of a photoresist film continuously extending over the layered composite and the material layers.
Figure 13:
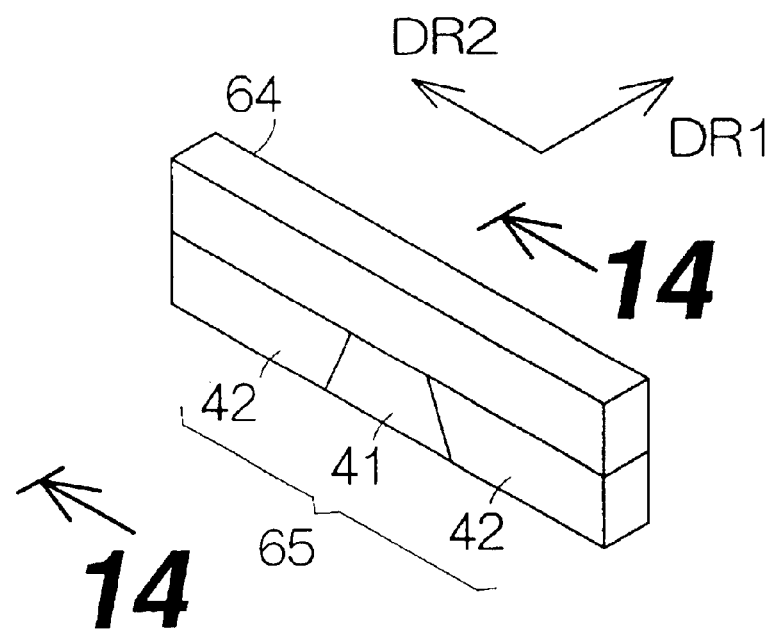
FIG. 13 is a perspective view of the layered composite and the material layers remaining below the photoresist film after an ion milling process.

As shown in FIG. 12, a stripe of a photoresist film 64 is then formed on the layered composite 56 and the material layers 63 continuous to one another. The stripe of the photoresist film 64 is designed to extend in the second direction DR2 so as to define the contour of a combined stripe in which the spin valve film 41 and the domain control stripe layers 42 are arranged in a row. An ion milling process is thereafter effected on the layered composite 56 and the material layers 63. The layered composite 56 and the material layers 63 are thus removed in a region adjacent the stripe of the photoresist film 64. The combined stripe 65 of the spin valve film 41 and the domain control stripe layers 42 can be obtained right below the stripe of the photoresist film 64 so as to extend in the second direction DR2, as shown in FIG. 13.

Figure 14:
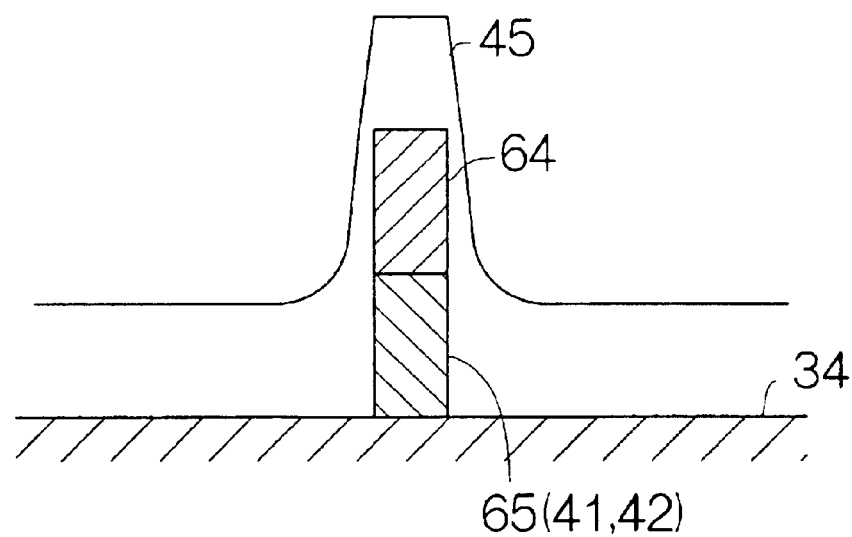
FIG. 14 is a partial sectional view taken along the line 14—14 in FIG. 13.

An alumina layer, namely, the insulating base layer 45 is then formed to constantly extend over the surface of the non-magnetic gap layer 34. As shown in FIG. 14, the insulating base layer 45 is designed to cover over the stripe of the photoresist film 64 on the combined stripe 65. The thickness of the insulating base layer 45 may be set in a range between approximately 1.0 nm and 30.0 nm, for example. A sputtering process may be employed to form the insulating base layer 45, for example.

Figure 15:
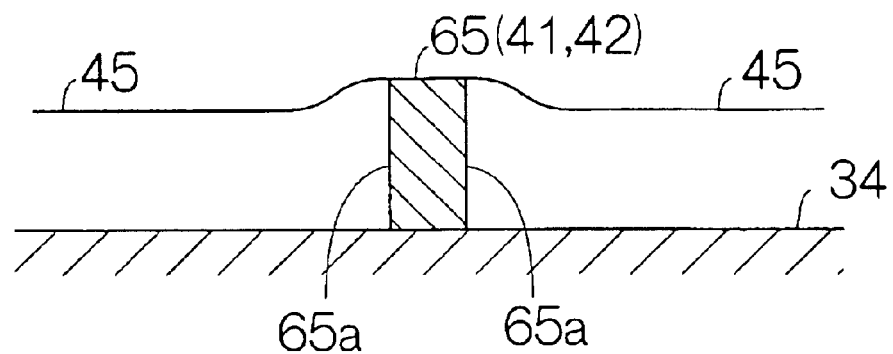
FIG. 15 is a partial sectional view, corresponding to FIG. 14, for illustrating the process of removing the photoresist film.

When the photoresist film 64 has been removed after the formation of the insulating base layer 45 in the aforementioned manner, the combined stripe 65 is allowed to expose at a gap defined in the insulating base layer 45, as shown in FIG. 15. Specifically, the combined stripe 65 of the spin valve film 41 and the domain control stripe layers 42 are embedded at the gap defined in the insulating base layer 45 spreading over the non-magnetic gap layer 34. A side surface 65a is defined on the combined stripe 65 so as to stand on the surface of the non-magnetic gap layer 34. The side surface 65a corresponds to the side surface 46 of the spin valve film 41 and the side surfaces 47 of the domain control stripe layers 42. The insulating base layer 45 is allowed to contact the side surface 65a of the combined stripe 65. An $O_2$ plasma, a suitable photoresist stripper or stripping solution, and the like, may be employed to remove the photoresist film 64, for example.

Figure 16:
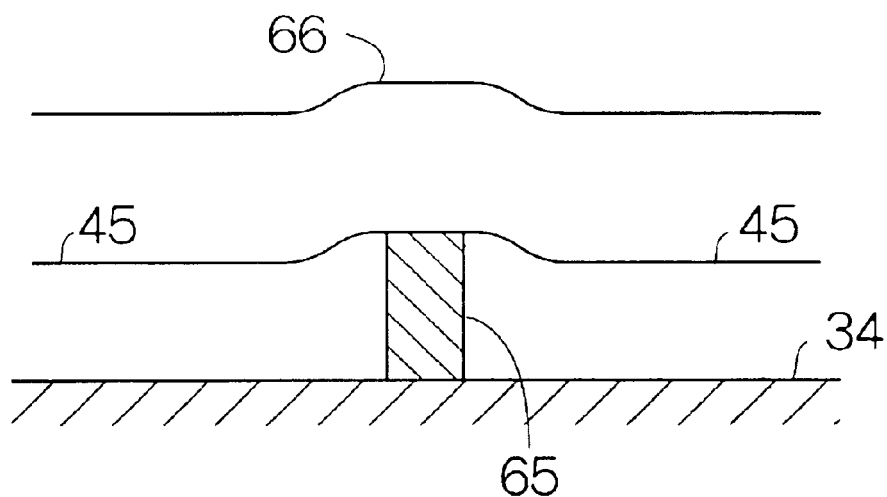
FIG. 16 is a partial sectional view, corresponding to FIG. 15, for illustrating the process of forming a conductive material layer.
Figure 17:
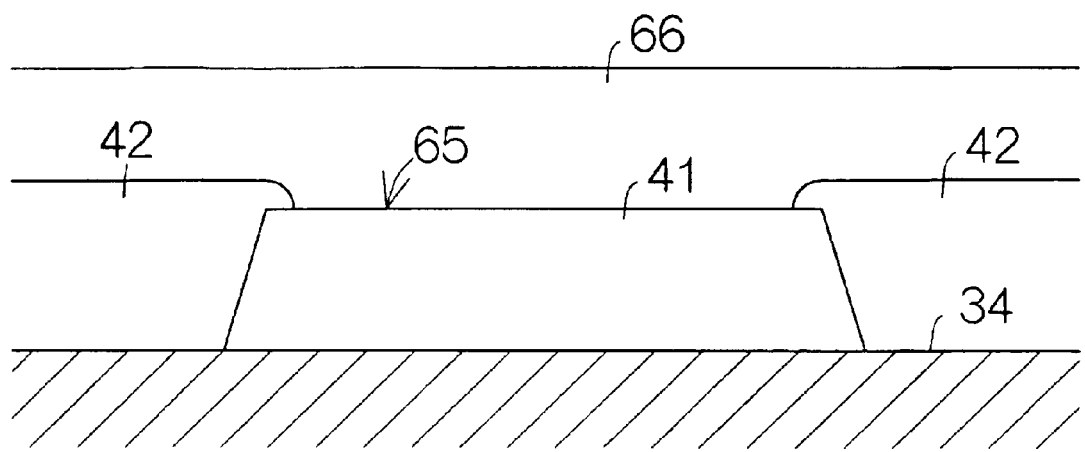
FIG. 17 is a sectional view taken along the line 17—17 in FIG. 16.
Figure 18:
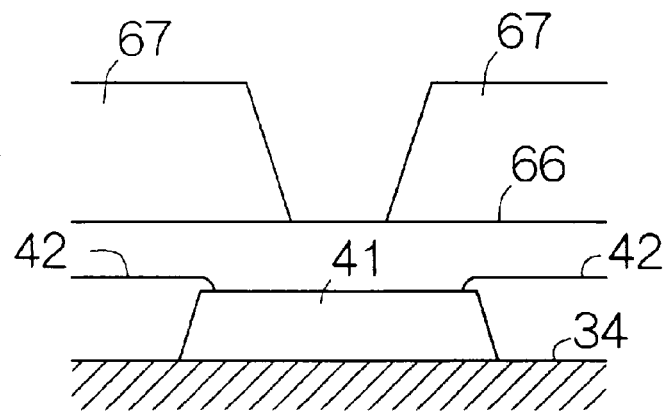
FIG. 18 is a partial sectional view, corresponding to FIG. 17, for illustrating the process of forming a photoresist film on the conductive material layer.

A conductive material layer 66 is then formed to uniformly extend over the surface of the insulating base layer 45. The conductive material layer 66 is designed to simultaneously cover over the combined stripe 65 exposed at the gap in the insulating base layer 45, as shown in FIGS. 16 and 17. The conductive material layer 66 may include a Ta basement layer of approximately 7.0 nm thickness, and an Mo layer of approximately 50.0 nm superposed on the Ta basement layer, for example. A photoresist film 67 is then formed to extend over the conductive material layer 66, as shown in FIG. 18, for example. The photoresist film 67 has a shape corresponding to the extent of the conductive lead layers 43. An I-line stepper may be employed to form the photoresist film 67, for example.

Figure 19:
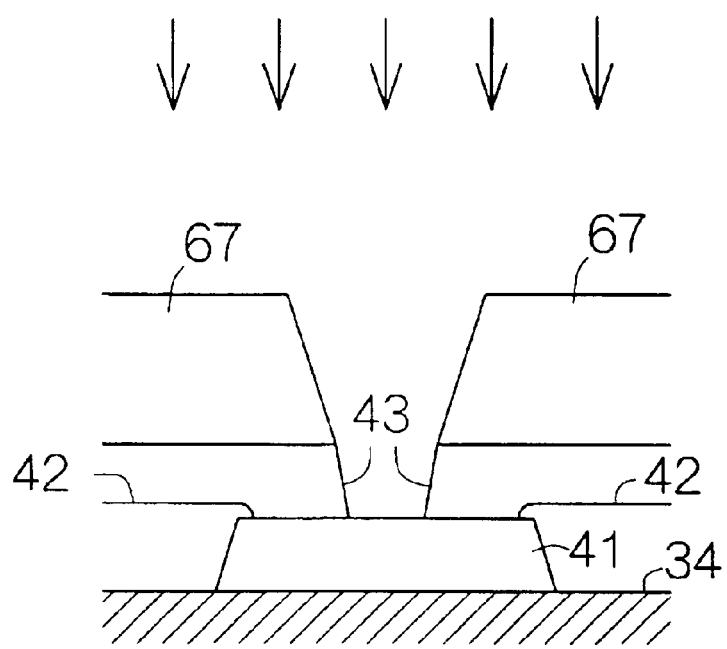
FIG. 19 is a partial sectional view, corresponding to FIG. 18, for illustrating a reactive ion etching (RIE) process on the conductive material layer.

As shown in FIG. 19, the conductive material layer 66 is then subjected to a dry etching process. A fluorinate gas such as $SF_6$ gas may be employed as an etching gas in the dry etching process, namely, a reactive ion etching (RIE) process. The etching gas serves to remove the conductive material layer 66 in a void defined in the photoresist film 67. The conductive lead layers 43 are thus shaped out of the conductive material layer 66 below the photoresist film 67.

During the etching process, the insulating base layer 45 keeps covering over or contacting the side surface 65a of the combined stripe 65, namely, the side surface 46 of the spin valve film 41, as shown in FIG. 15, for example. The side surface 46 of the spin valve film 41 can be prevented from being subjected to the etching gas. It is thus possible to reliably avoid generation of reaction products based on oxidation of Cu atoms included in the non-magnetic spacer layer 53, oxidation of Co atoms included in the free and pinned layers 52, 54, and a chemical reaction of the Cu and Co atoms attacked by the $SF_6$ gas. Moreover, even when the spin valve film 41 is exposed at the gap defined in the insulating base layer 45, the Au layer included in the cap layer serves to reliably prevent the spin valve film 41 from being etched.

Figure 20:
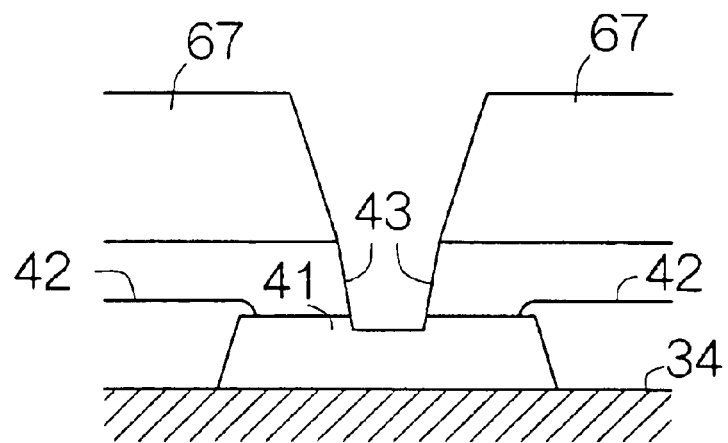
FIG. 20 is a partial sectional view, corresponding to FIG. 19, for illustrating the process of removing a cap layer or an Au layer.

When the conductive lead layers 43 have been formed in the aforementioned manner, the Au layer is removed from the top of the spin valve film 41, as shown in FIG. 20. An ion milling process is effected on the Au layer while the photoresist film 67 is maintained. An argon ion beam is introduced in the direction normal to the surface of the non-magnetic gap layer 34. The Au layer is thus removed in a region adjacent the photoresist film 67. The Ta layer included in the cap layer serves to reliably prevent the spin valve film 41 from being etched even after the Au layer has been removed.

Figure 21:
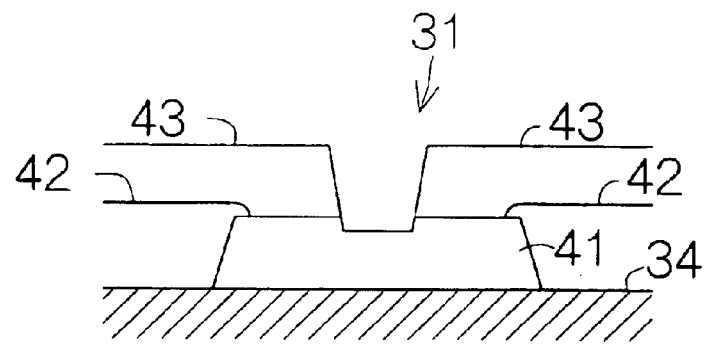
FIG. 21 is a partial sectional view, corresponding to FIG. 20, for illustrating the process of finally removing the photoresist film.
Figure 22:
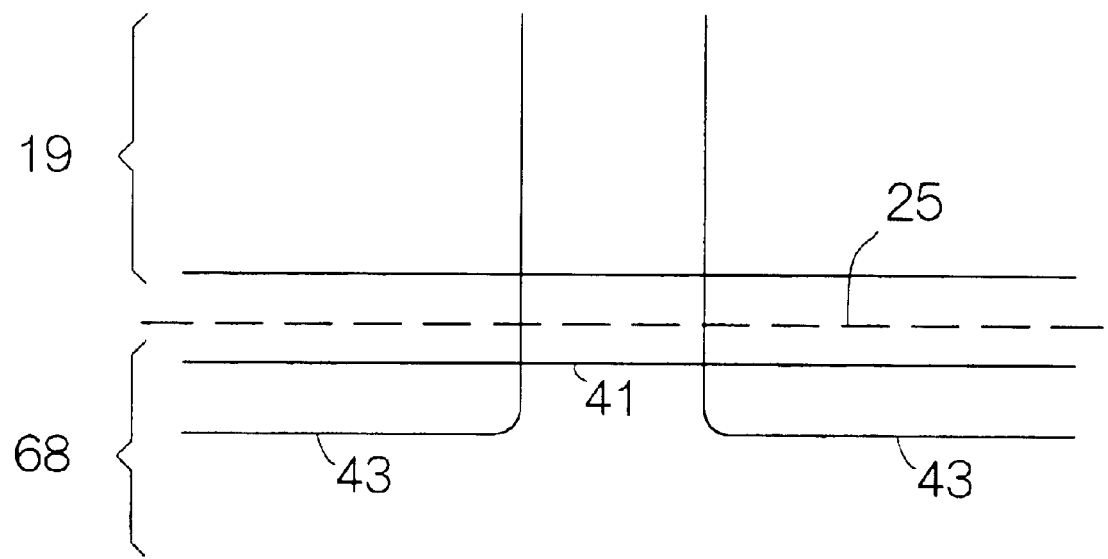
FIG. 22 is an enlarged partial plan view of the resulting magnetoresistive head element.

As shown in FIG. 21, the photoresist film 67 is thereafter removed. An $O_2$ plasma, a suitable photoresist stripper or stripping solution, and the like, may be employed to remove the photoresist film 67, for example. Formation of the magnetoresistive head element 31 is accordingly completed. Thereafter, the non-magnetic gap layer 33 and the thin film magnetic head element 32 are sequentially formed on the resulting magnetoresistive head element 31 in a conventional manner. As shown in FIG. 22, an extra marginal section 68 is finally scraped in the individual flying head slider 19 during formation or shaping of the bottom surface 25. When the extra marginal section 68 has completely been cut off, the read gap of the magnetoresistive head element 25 is allowed to expose at the bottom surface 25 in the aforementioned manner.

Figure 23:
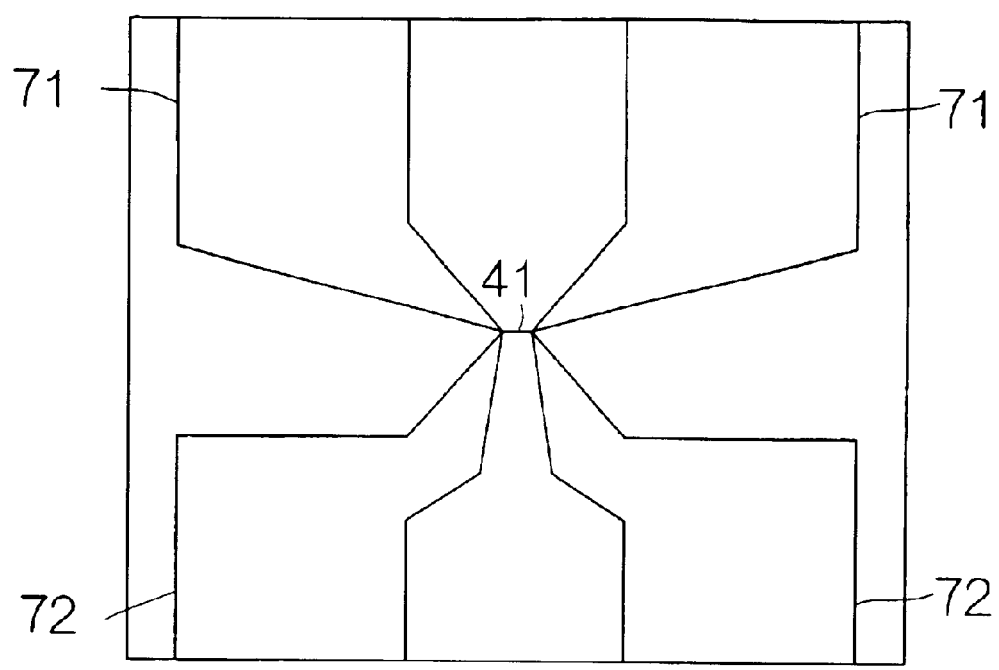
FIG. 23 is a plan view illustrating a test element group (TEG) pattern employed in observation of the magnetoresistive effect of the magnetoresistive head element.
Figure 24:
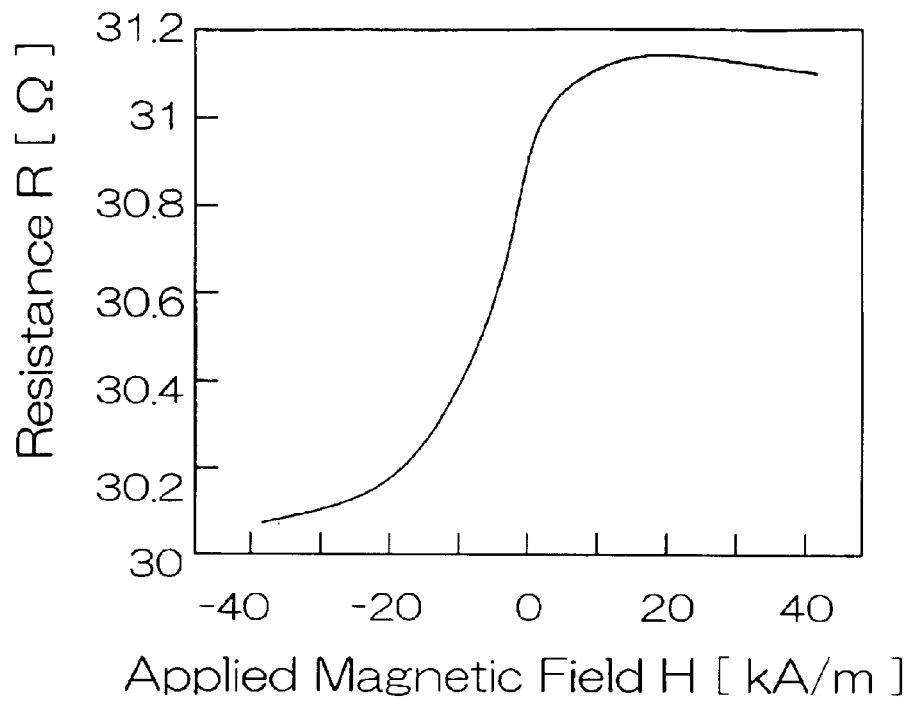
FIG. 24 is a graph illustrating the magnetoresistive effect curve measured for the magnetoresistive head element according to the present invention.

The inventors have carefully observed the magnetoresistive (MR) effect of the aforementioned magnetoresistive head element 31. A so-called test element group (TEG) pattern was employed to achieve the observation. As shown in FIG. 23, an electric current of a predetermined level was supplied to the spin valve film 41 through a pair of current leads 71 in the TEG pattern. A voltage was measured through a pair of voltage terminals 72 in response to supply of the electric current. When the voltage was measured, a magnetic field applied to the spin valve film 41 was varied in a range between −40 kA/m and 40 kA/m. The spin valve film 41 in this case had the longitudinal dimension of 0.3 μm and the lateral dimension of 0.5 μm. According to the measurement, it has been confirmed that the aforementioned magnetoresistive head element 31 is allowed to exhibit an ideal characteristic in the magnetoresistive effect curve, as shown in FIG. 24.

Figure 25:
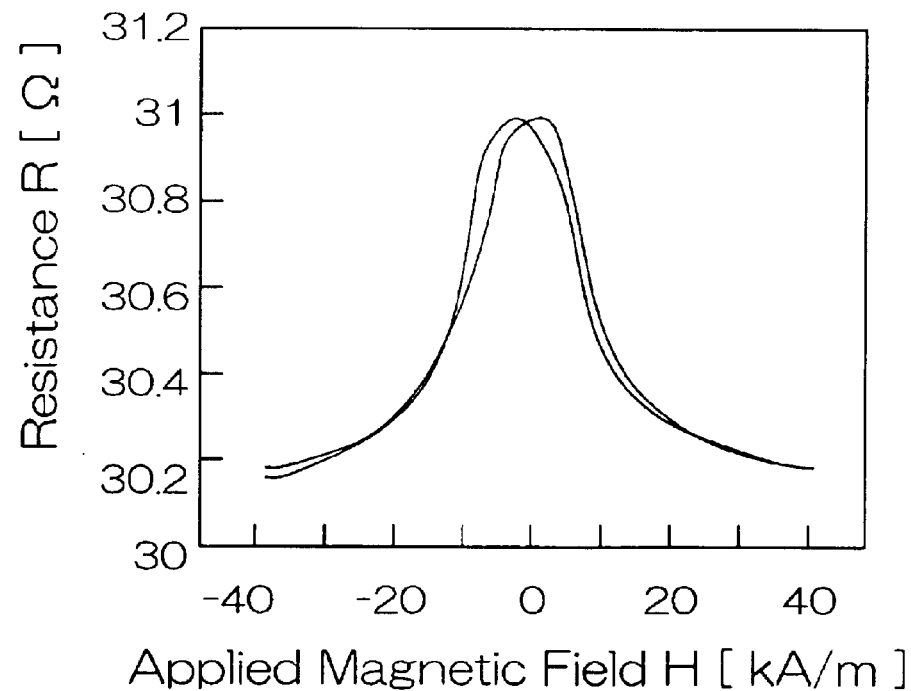
FIG. 25 is a graph illustrating the magnetoresistive effect curve measured for a conventional magnetoresistive head element without the insulating base layer of the present invention.

The inventors have also made an observation on the magnetoresistive effect of a conventional magnetoresistive head element by utilizing the aforementioned TEG pattern. The conventional magnetoresistive head element was made in accordance with a conventional production method without formation of the insulating base layer 45. The remaining structure was formed identical to those of the aforementioned magnetoresistive head element 31. In this case, the observation has revealed that the resistance detected at the conventional magnetoresistive head element increased in response to the increase to zero from the minimum negative level in the magnitude of magnetic field applied to the spin valve film, while the resistance decreased in response to a further increase in the magnitude of the magnetic field beyond zero toward the maximum positive level, as shown in FIG. 25. The conventional magnetoresistive head element thus cannot be utilized to discriminate magnetic binary data of opposite polarity.

The inventors have also observed the conventional magnetoresistive head element with a scanning electron microscope (SEM). The inventors have found an adhesion of an unexpected substance on the surface of the spin valve film in the conventional magnetoresistive head element. Subsequently, the inventors have analyzed the constituent of the unexpected substance with an Auger electron spectroscopy analyzer. The inventors have confirmed that the unexpected substance contained Co and Cu atoms. It is expected that the unexpected substance is a metallic compound generated through oxidation of the Cu atoms included in the non-magnetic spacer layer 53, oxidation of the Co atoms included in the free and pinned layers 52, 54, a chemical reaction of the Cu and Co atoms attacked by the $SF_6$ gas, and the like. The advantage of the insulating base layer 45 according to the present invention has been verified in this manner.

It should be noted that the aforementioned fluorinate gas such as $SF_6$ gas may be replaced with an inert gas such as $BCl_3$ in the RIE etching process. Any material may be selected for the aforementioned insulating base layer 45 only if the layer 45 is allowed to keep contacting the side surface 46 of the spin valve film 41 irrespective of application of the etching gas of the RIE etching process.

What is claimed is:

1. A method of making a magnetoresistive head element, comprising:

forming a magnetoresistive film extending over a surface of a substratum, said magnetoresistive film having a side surface standing on the surface of the substratum;

forming an insulating base layer over the surface of the substratum, said insulating base layer contacting at least partly the side surface of the magnetoresistive film; and effecting an etching process while keeping the insulating base layer contacting the side surface of the magnetoresistive film.

2. The method of making according to claim 1, further comprising:

forming a conductive layer covering over at least the magnetoresistive film and the insulating base layer, prior to the etching process; and exposing the conductive layer to an etching gas with the side surface of the magnetoresistive film kept covered.

3. The method of making according to claim 1, further comprising:

forming a domain control stripe layer over the surface of the substratum, prior to formation of the insulating base layer, said domain control stripe layer contacting the magnetoresistive film at its tip end; and allowing the insulating base layer to contact a side surface of the domain control stripe layer adjacent the side surface of the magnetoresistive film.

4. The method of making according to claim 3, further comprising:

forming a conductive layer covering over at least the magnetoresistive film and the insulating base layer, prior to the etching process; and exposing the conductive layer to an etching gas with the side surface of the magnetoresistive film kept covered.

5. A method of making a magnetoresistive head element, comprising:

forming a layered composite, corresponding to a layered structure of a magnetoresistive film, over a surface of a substratum;

forming a pair of material layers, corresponding to materials of domain control stripe layers, over the surface of the substratum, said material layers interposing the layered composite therebetween along the surface of the substratum;

forming a resist film on the layered composite and the material layers so as to pattern a shape of the magnetoresistive film and the domain control stripe layers being continuous to one another;

removing the layered composite and the material layers in a region adjacent the resist film so as to shape the magnetoresistive film and the domain control stripe layers out of the layered composite and the material layers below the resist film;

forming an insulating base layer over the resist film and the surface of the substratum; and removing the resist film so as to expose the magnetoresistive film and the domain control stripe layers at a gap defined in the insulating base layer.

6. The method of making according to claim 5, further comprising: effecting an etching process while keeping the insulating base layer in a region adjacent the magnetoresistive film over the surface of the substratum.

7. The method of making according to claim 6, further comprising:

forming a conductive layer covering over at least the magnetoresistive film and the insulating base layer, prior to the etching process; and exposing the conductive layer to an etching gas with a side surface of the magnetoresistive film kept covered, said side surface being defined to stand on the surface of the substratum.

* * * * *